United States Patent

Atkinson et al.

(10) Patent No.: US 6,717,124 B2
(45) Date of Patent: Apr. 6, 2004

(54) AUTOFOCUS Z STAGE

(75) Inventors: Matthew R. C. Atkinson, Cottage Grove, MN (US); Orlin B. Knudson, Vadnais Heights, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/411,733

(22) Filed: Apr. 11, 2003

(65) Prior Publication Data

US 2003/0197112 A1 Oct. 23, 2003

Related U.S. Application Data

(62) Division of application No. 09/441,731, filed on Nov. 16, 1999, now Pat. No. 6,548,795.
(60) Provisional application No. 60/160,836, filed on Oct. 21, 1999.

(51) Int. Cl.[7] .............................. G02B 27/40; G02B 7/04
(52) U.S. Cl. ................. 250/201.2; 250/201.4; 369/44.41
(58) Field of Search ......................... 250/201.2, 201.4, 250/201.5, 201.6, 208.2, 234, 548; 369/44.11, 44.23, 44.24, 44.41, 44.42; 355/56; 359/609, 624

(56) References Cited

U.S. PATENT DOCUMENTS

| 4,542,491 A | * | 9/1985 | Takasago et al. | ........ 369/44.29 |
|---|---|---|---|---|
| 5,033,856 A | | 7/1991 | Nose et al. | |
| 5,192,980 A | | 3/1993 | Dixon et al. | |
| 5,248,992 A | | 9/1993 | Ferschl | |
| 5,381,224 A | | 1/1995 | Dixon et al. | |
| 5,386,112 A | | 1/1995 | Dixon et al. | |
| 5,400,093 A | | 3/1995 | Timmers | |
| 5,475,728 A | | 12/1995 | Smith et al. | |
| 5,532,873 A | | 7/1996 | Dixon | |
| 5,760,951 A | | 6/1998 | Dixon et al. | |
| 5,900,949 A | | 5/1999 | Sampas | |

FOREIGN PATENT DOCUMENTS

| EP | 0 503 874 A2 | 9/1992 |
|---|---|---|
| EP | 0 867 771 A2 | 9/1998 |
| WO | WO 97/22900 | 6/1997 |
| WO | WO 98/47006 | 10/1998 |
| WO | WO 98/59314 | 12/1998 |
| WO | WO 99/08233 | 2/1999 |
| WO | WO 99/53319 | 10/1999 |

OTHER PUBLICATIONS

Optical Society of America's Handbook of Optics, vol. 1, Section 31.4, pp. 31.13–31.14, McGraw Hill (1995).

* cited by examiner

Primary Examiner—Kevin Pyo

(57) ABSTRACT

The present invention provides for very rapid autofocusing of optical scanning systems. If a sample is sufficiently out of focus, the focal error signal used to focus a conventional half-blocked system can become saturated. Multiple steps toward the focus position then typically are required to bring the system into the operational range. To minimize this, a light adjustment system is provided to reduce the amount of light impinging on the half-blocked system when the focal error signal is at or near saturation. The half-blocked system then becomes primary controller again, and can move the system into a position generally close to the correct focal point. The light adjustment system then can be deactivated, but since the system now is much closer to focus, the half-blocked system can quickly bring the system into final focus. Alternatively, the photodetectors used to generate the focal error signal are segmented. The approximate distance to the correct focal point then is determined by comparing the amount of light detected by segments at different radial positions.

2 Claims, 6 Drawing Sheets

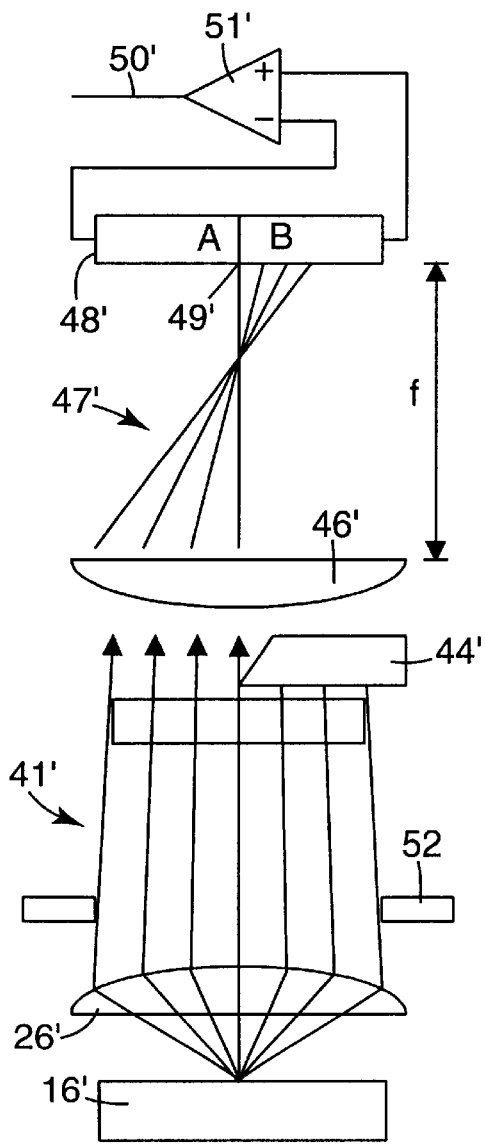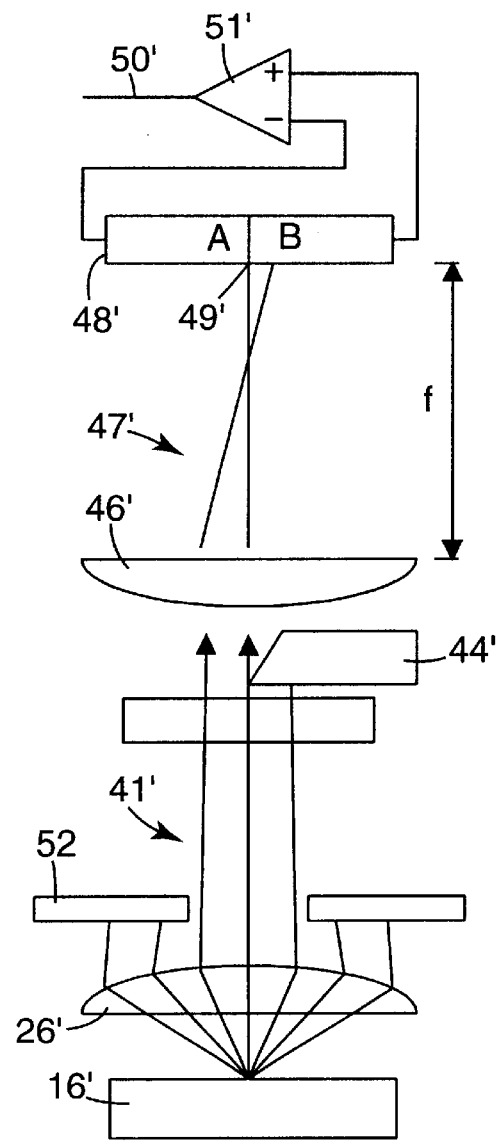
Fig. 5a  Fig. 5b

AUTOFOCUS Z STAGE

CROSS-REFERENCE TO RELATED APPLICATIONS

This application is a divisional of U.S. Ser. No. 09/441,731, filed Nov. 16, 1999, now U.S. Pat. No. 6,548,795; which claims priority to U.S. Provisional Patent Application No. 60/160,836, filed Oct. 21, 1999, the disclosure of which is herein incorporated by reference.

GOVERNMENT LICENSE RIGHTS

The U.S. Government has a paid-up license in this invention and the right in limited circumstances to require the patent owner to license others on reasonable terms as provided for by the terms of contract NIMA-202-979-1051 awarded by the National Imagery and Mapping Agency of the Department of Commerce.

BACKGROUND OF THE INVENTION

1. Technical Field

The present invention relates to automated focusing systems, in particular to extremely rapid automatic focusing of optical scanning systems.

2. Description of the Related Art

With the development of combinatorial chemistry and bioassays, automated imaging is becoming extremely important. A large variety of tests can be conducted with such systems, such as are disclosed in WO 99/08233 and WO 98/47006. Some of these tests, particularly ones based on fluorescence and reflected light, use confocal systems such as those disclosed in U.S. Pat. No. 5,900,949. In such a system, light is applied through the optics of the system to excite a sample to fluoresce or phosphoresce, or simply to reflect the light. The resulting emitted, reflected or scattered light then is detected either through a separate optical system to the side of the light source, as shown in U.S. Pat. No. 5,900,949, or through reflection or emission back through the same initial optical system as the light source, by way of a half-silvered mirror or di-chroic beam splitter.

In a typical scanning system (illustrated in FIG. 1) a focused beam of light moves across a sample and the resultant reflected or fluorescent light is detected. A fluorescent system typically includes a source of light 10 at the proper wavelength, $\lambda_{ex}$, to excite the sample or a dye in the sample. This light is focused through source optics 12 and deflected by mirror 14 via scan lens 26 onto sample 16. Light that fluoresces or is reflected from the sample returns to detection optics 18 via half silvered mirror or dichroic beam splitter 15. Alternatively, the emitted or fluoresced light can be detected from the side of the system, as shown in U.S. Pat. No. 5,900,949. Light passing through detection optics 18 then is detected using a CCD or equivalent element 20, the output from which is provided to computer 22 for analysis. Motor 24 is used to move mirror 14 to scan the excitation beam across the sample 16. The excitation beam, motor, optics and the rest of the system then are controlled by computer 22 to scan relevant portions of sample 16.

In a true confocal system, the system will reject light that is not substantially in focus. As illustrated in FIG. 2, the light in such a confocal system typically will be deflected by mirror 14 through scan lens 26. A confocal system typically has a very small depth of field d, as illustrated in FIG. 2. Sample 16 is in scan field 29, that is, in the depth of field d, for a scan across sample 16, traversing the range of scan. The focal length of the system is f, and the relative sizes of the values are f>>d>>λ. The range of scan may vary from tens of micrometers to centimeters, depending on the system.

For a truly flat and level surface in a confocal system, once the collection system and the sample are brought into focus, no more focusing along the +z or −z axis (up or down, as shown in FIG. 2) is required. If the light beam is scanned, the assumption is that the design of the system is such that rotation of mirror 14 does not move the light beam out of the nominal plane of focus, i.e., scan field 29 is essentially flat in the area where the sample is located.

As will be apparent, the sample must be kept continuously in focus during a scan. One technique for doing this automatically or manually brings the sample into focus below a stationary focused beam, only once, and then scans the sample by moving it on an x-y translation stage. The distance from the sample to the objective then remains constant since the sample does not move up or down, throughout the scan. This method is used by several imaging manufacturers.

Autofocus systems for optical scanners often use a half-blocked or obscuration technique to bring the sample into focus, such as is shown in FIGS. 3a, b, c, and described in detail in section 31.4 of the Optical Society of America's Handbook of Optics Vol. 1 (on CD-ROM), published by McGraw Hill (1996). In such a system, light 41 reflected or emitted from sample 16 passes through a lens 26. Most of the light passing through lens 26 then will be directed to the detection optics for analysis, but, as shown in FIG. 1, some of the light will be directed by a low reflection beam splitter 40 to the autofocusing system 42, shown in detail in the upper portions of FIGS. 3a, b, c. (For clarity of illustration, beam splitter 40 is omitted from FIGS. 3a, b, c.)

If sample 16 is in focus, as shown in FIG. 3b, light 41 is collimated, so that light 47 passing through lens 46 is properly focused on focal point 49. If sample 16 is too far from lens 26 (the −z direction), light 41 tends to converge too much, as shown in FIG. 3a. If sample 16 is too close to lens 26 (the +z direction), light 41 tends to diverge too much, as shown in FIG. 3c.

In a typical autofocusing system, half of the beam of light 41 is blocked by knife edge 44. The remaining portion of light 41 passes through lens 46 to become light 47 and impinges upon photodetector 48. Photodetector 48 typically has halves A, B centered on the focal point 49 of the photodetector 48, with each half A, B serving as an independent detection region.

When properly focused, as shown in FIG. 3b, the light 47 impinges upon the center 49 of the photodetector 48, between halves A, B, or at the very least impinges equally upon halves A, B. In contrast, when sample 16 is too far from lens 26, as shown in FIG. 3a, more of light 47 impinges on photodetector portion B than on A, and similarly, as shown in FIG. 3c, when sample 16 is too close to lens 26, more of light 47 impinges on photodetector A than on B. Therefore, the position of sample 16 relative to lens 26 can be determined by analyzing the relative signal strengths being generated by photodetector portions A and B. This can be done through any suitable method, but is conveniently done by subtracting the values of the outputs of the two portions A and B of the photodetector in circuit 51 to generate a Focus Error Signal (FES) 50.

In theory, the absolute value of FES 50 is indicative of the distance by which sample 16 is out of focus, while the positive or negative value of FES 50 indicates the direction in which the sample 16 is out of focus. When sample 16 is in focus, light 47 either impinges on photodetector center 49, or at least is equally balanced between portions A, B, with the result that the value of FES 50 is 0 and—no z-axis adjustment is needed (it will be understood that the value need not be exactly 0—some range around 0 will normally be considered equivalent to 0). If more of light 47 impinges on half B of the detector (as shown in FIG. 3a), FES 50 is a positive signal, indicating that the z translation stage is off in the −z direction, so the stage should be moved in the +z direction to bring the system into focus. If sample 16 is too close to lens 46, more light 47 hits A than B, and FES 50 is negative, indicating that the stage is out of focus in the +z direction, and should be moved in the −z direction to bring the system into focus. Z-axis translation stages responsive to such an FES signal in this fashion are commercially available.

SUMMARY OF THE INVENTION

While working with new materials to hold samples, the inventors encountered problems with focusing the prior art systems when the sample surface itself undulates significantly. As illustrated in FIG. 4, if the surface of sample 16 is not smooth, portions of the surface may be out of focus, even though sample 16 as a whole stays at the same distance from the lens 26. This may be true of both scanning beam and scanning stage systems.

Specifically, FIG. 4 illustrates a set of DNA oligonucleotide probes 30 deposited on the surface of substrate 16. Such probes often are chemical systems which combine with immobilized clipped DNA fragments to identify the presence or absence of various DNA structures.

As will be apparent in FIG. 4, there is a base height h that is the minimum thickness of the substrate, but there is also a variability Δh in the height of the surface of the substrate. Depending on the substrate used, Δh can be considerably larger than the depth of field d for the focused light beam 34. As a result, DNA probes 30 may be in or out of focus even without any vertical movement of substrate 16.

Such substrate undulation can be minimized, but usually requires significant machining or use of fairly expensive materials such as silicon wafers or glass. Inexpensive materials, such those taught in WO 99/53319, are particularly likely to have such undulating surfaces, but are highly desirable for use.

Therefore, if as shown in FIG. 4 the sample surface height variation Δh is greater than the depth of field d, some system must be in place to keep probes 30 within depth of field d or regions of the image will be blurry in a non-confocal system, or dark in a confocal system. Such a system must be capable of refocusing easily at different depths, but at the same time, the system must be extremely fast. This can be done by moving the focusing lens, but is more commonly done by moving the stage, which might be piezoelectric stage, a stage mounted to a solenoid or voice coil, or a translation stage. In any case, the position of the stage is responsive to the output of the computer.

The difficulty is the number of times the system must be refocused. For example, to capture a 512 pixel×512 pixel image (a frame) in five seconds, the autofocus change must take no more than 19 micro-seconds for autofocus from pixel to pixel (5 seconds divided by 512×512 pixels). This requires an extremely rapid autofocus system.

The inventors recognized that in actual practice, the absolute value of the FES indicates the distance by which the sample is out of focus only if the sample is not too far out of focus. If the sample is too far out of focus, the direction can still be determined from the positive or negative value of the FES, but the distance to the proper focal position cannot be determined accurately, because the FES becomes saturated, that is, the FES reaches a plateau. When the FES is saturated, the absolute value of the FES indicates only the saturation level and no longer indicates the distance to the correct focal point. The system or operator must then "guess" how much to move the sample to get it into focus, i.e., move it by some arbitrary amount. If the initial move is not far enough, another guess is necessary, while if it is too far, a move in the opposite direction may be needed. This repeated guessing severely limits the speed with which the system can refocus as it scans from one point to the next.

The present invention therefore provides consistently rapid focusing by combining a half-blocked autofocus system with a variation in the amount of light being applied to the sample.

A first embodiment of the present invention accomplishes rapid focusing by determining when the FES is ambiguous, and modifying the amount of light reaching the photodetector when it is ambiguous. Specifically, if the FES is ambiguous, the diameter or area of the beam of light is reduced by some predetermined amount. This will then unsaturate the FES and allow the system to move the lens or sample quickly to a position relatively near the optimum focus. The light beam diameter or area then can be increased back up, and final focusing done.

A second embodiment of the present invention accomplishes rapid focusing by providing an additional mechanism for determining the approximate distance to the correct focal point. This may be done by providing a photodetector which can directly detect the radial offset of the light beam striking the photodetector, so the distance can be determined without relying on the absolute value of the difference between the signals on opposite sides of the photodetector.

Still further, both embodiments may be combined to maximize the distance over which the system can quickly focus.

With any of the above embodiments, the result is a two step process that can focus quite rapidly, and considerably more rapidly on average than done with a conventional half-blocked system alone. Combined with a very rapid z stage control, such as a piezoelectric fast response system, and suitably rapid electronic control circuitry or software, the system can achieve the rapid response time desired for scanning systems.

As will be apparent, having such a rapid autofocus will allow use of less expensive substrates with undulating surfaces, while at the same time allowing rapid image acquisition of the resulting product.

BRIEF DESCRIPTION OF THE DRAWINGS

The invention will be described with reference to the drawings, in which:

FIGS. 5a, b are schematic illustrations of the half-blocked focusing system of FIGS. 3a, b, c modified according to a first embodiment according to the present invention.

DETAILED DESCRIPTION OF THE PREFERRED EMBODIMENTS

Simply put, the inventors have recognized that the problem with the prior half-blocked systems arises because the FES is saturated. The present invention therefore provides a mechanism to reduce the area of the light incident on the photodetectors, and thereby extend the capture region in which the system will operate properly. Alternatively, the present invention provides a mechanism to measure the distance by which sample is out of focus by determining the radial extent of the light beam incident on the photodetectors.

Figure 1:
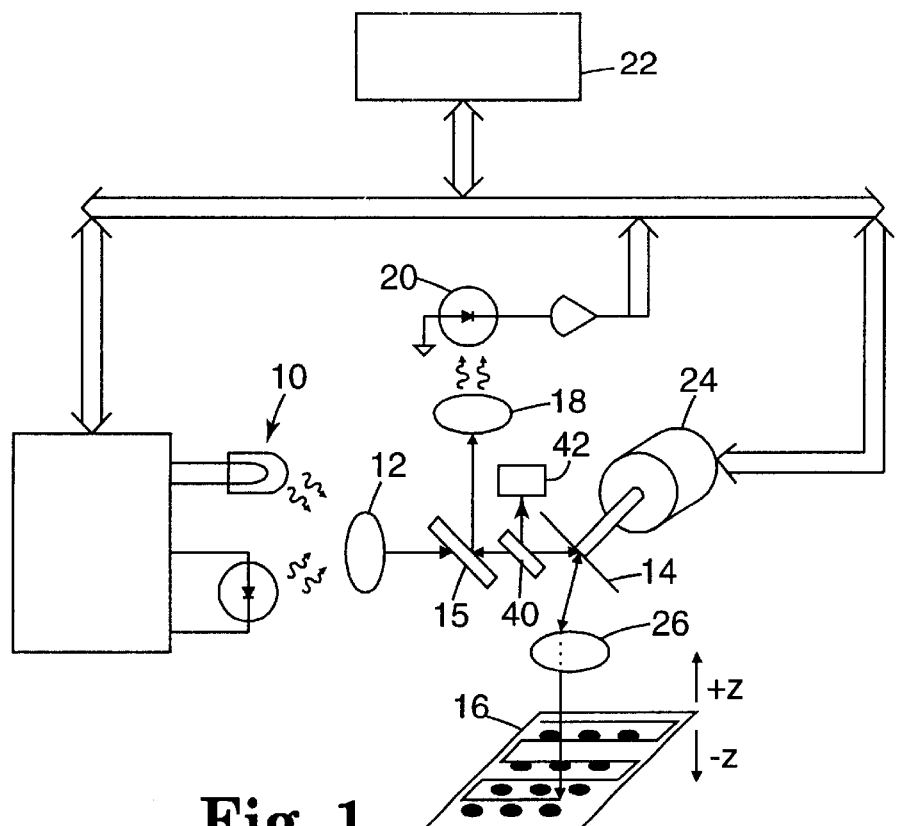
FIG. 1 is a schematic representation of a typical prior art optical scanning system.
Figure 2:
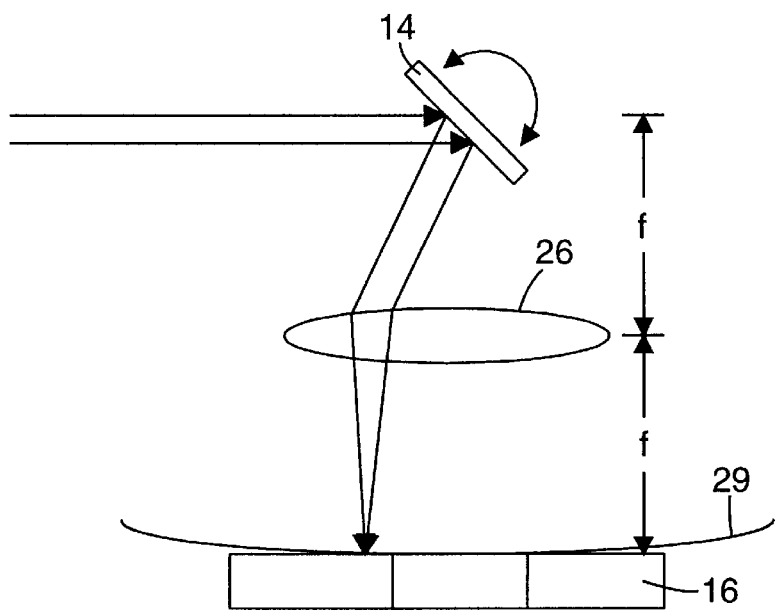
FIG. 2 is a schematic representation of the scanning portion of the optical scanning system of FIG. 1.
Figure 3:
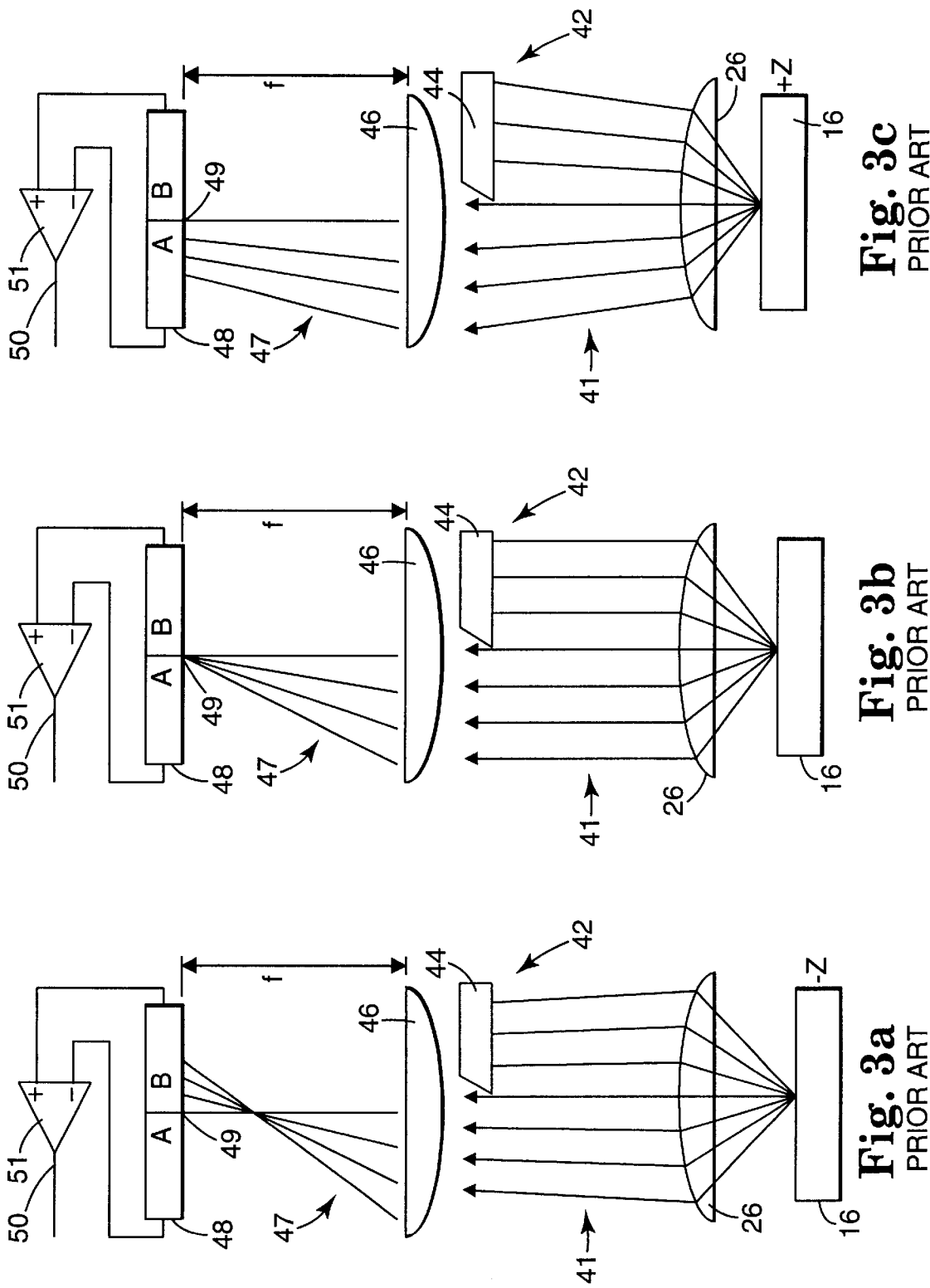
FIGS. 3a, b, c, are schematic illustrations of a typical prior art half-blocked focusing system in different stages of focus.
Figure 4:
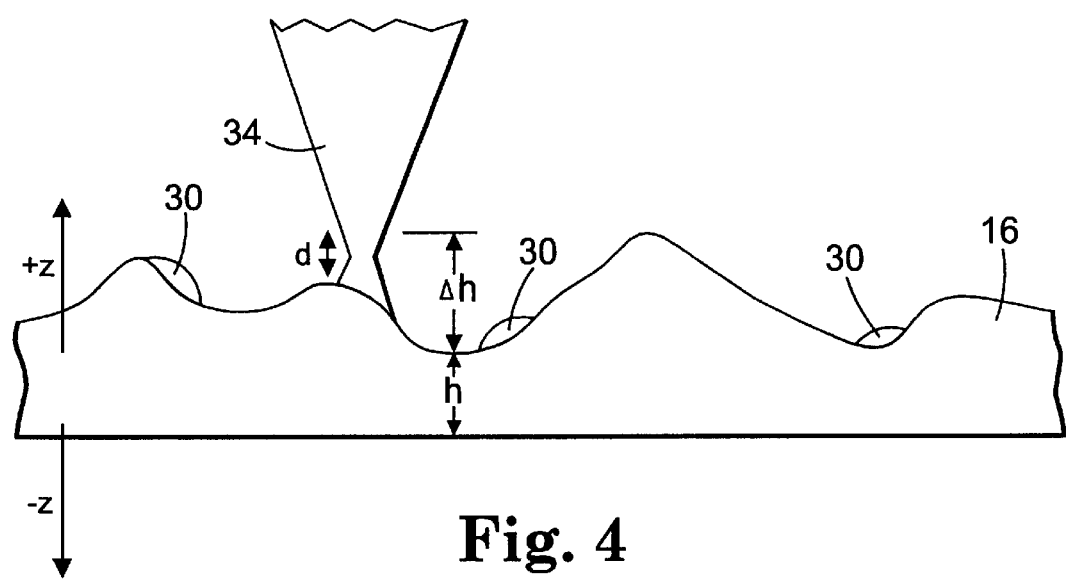
FIG. 4 is a schematic cross-sectional representation of a possible sample to be scanned by an optical scanning system.

A first embodiment of the present invention is shown in FIGS. 5a, b. In FIGS. 5a, b, the elements analogous to those shown in FIGS. 3a, b, c have been shown with the same numbers with a prime (').

According to this embodiment of the invention, an iris 52 is added between lens 26' and knife edge 44', preferably closer to lens 46' than to the beam splitter 40 to avoid interfering with the light going to the main optics 18. When iris 52 is dilated fully, as shown in FIG. 5a, all of light 47' that previously would have reached photodetector 48 in FIGS. 3a, b, c, still reaches photodetector 48'. As has been recognized by the inventors, if sample 16' is too far out of focus, the absolute value of FES 50' will be above some predetermined value that indicates that FES 50' is saturated or nearly saturated. When this happens, computer 22' generates a light reduction signal (either digital or analog) to contract iris 52 to reduce the amount of light reaching photodetector 48', as shown in FIG. 5b.

Figure 6:
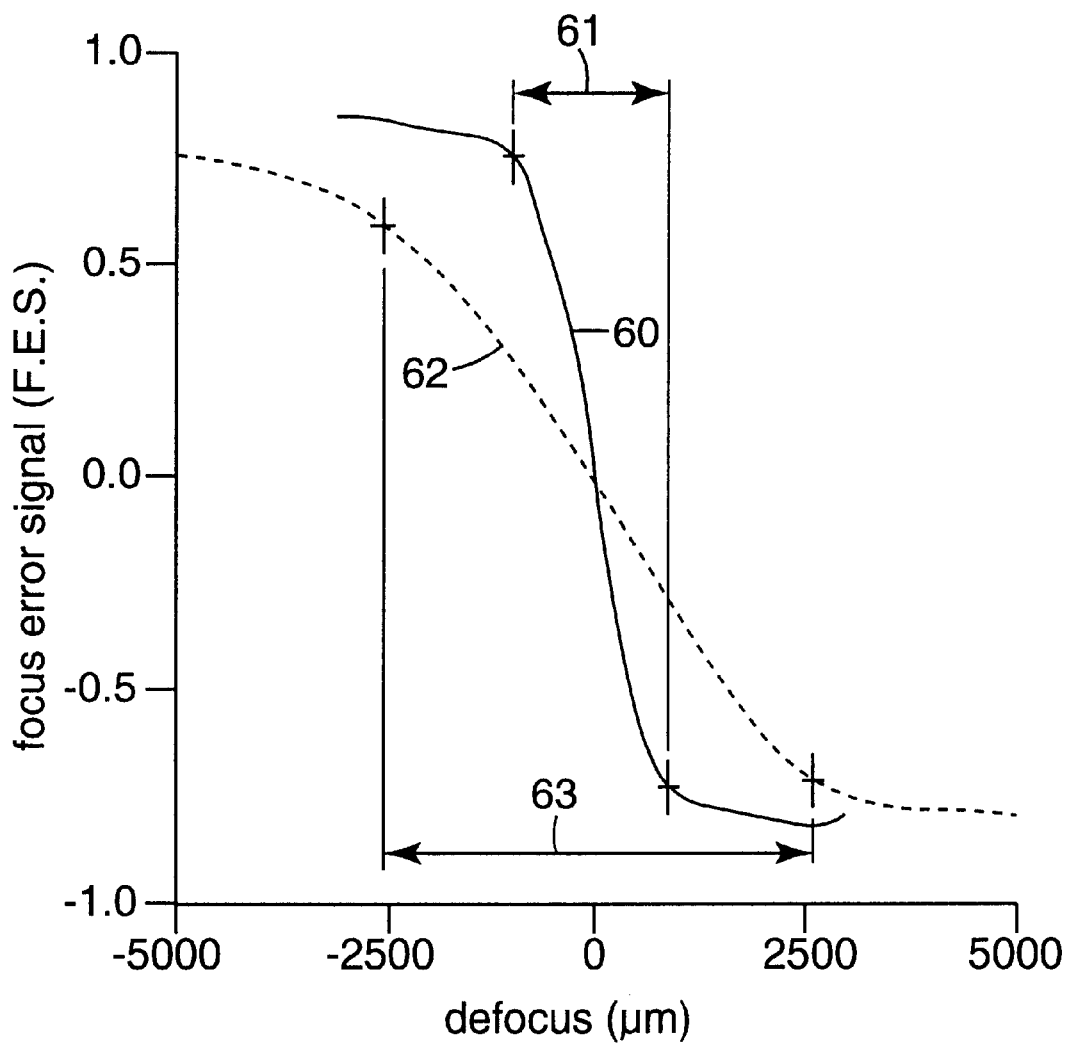
FIG. 6 is a graph of the focus error signal v. amount of defocus for the focusing systems of FIGS. 3a, b, c and 5a, b, respectively.

The effects of providing and using iris 52 in this fashion can be shown with reference to FIG. 6. Response curve 60 in FIG. 6 is a graph of the strength of FES 50 (from FIGS. 3a, b, c) versus the distance by which sample 16 is out of focus. The example in the graph uses a scanning lens 26 with a focal length of 5 cm, a light wavelength of 488 nm, beam diameter at the objective of 2 mm, a nominal distance from the scanning lens 26 through the scanning optics to the lens 46 of 1 cm and the aperture at the detector lens 46 of 2 mm, with the output of FES 50 normalized to ±1. Within a capture range 61 about ±500 μm from the correct focal position (indicated at 0 on the graph), circuit 51 provides an output such that the absolute value of FES 50 is a good indicator of the distance from the correct focal position. Beyond about ±500 μm, FES 50 nears saturation and then saturates, and the absolute value of FES 50 no longer correctly indicates the distance from the correct focal position. As a result, the effective capture range 61 for the system is slightly less than ±500 μm from the correct focal position.

Compare this to response curve 62, which is a graph of FES 50' from FIG. 5b, with iris 52 contracted so that the aperture at detector lens 46' is 1 mm to reduce by 50% the diameter of the beam of light 47' reaching photodetector 48' compared to the system for response curve 60. The capture region 63 of response curve 62 is accurate to roughly ±2500 μm, or roughly five times the size of capture region 61. This provides a much broader range over which the system can determine both the appropriate direction and the amount by which the z-stage should be moved to bring the sample into focus. Once that step has been made, iris 52 can be re-opened and fine focusing done using the full incident light beam.

The element reducing the transmitted light need not be an iris 52—the light reduction can be accomplished by any suitable mechanism, such as movable prisms or materials, such as segmented rings of liquid crystals, which can be electromagnetically controlled to control light transmission between sample 16' and photodetector 48'. In addition, while iris 52 has been shown positioned between lens 26' and knife edge 44', it will be appreciated that iris 52 could be positioned anywhere between sample 16' and photodetector 48'. However, positioning the light reduction element between lens 26' and knife edge 44' has the advantage of allowing use of the entire photodetector 48', while positioning it closer to photodetector 48' might block part of photodetector 48'.

In cases where the system is extremely out of focus, it is possible that even the present system might not bring the system close enough to the optimum focused position to avoid saturation when iris 52 is reopened. This could then result in an oscillation of resolution modes, bouncing back and forth between the iris being contracted and opened. To prevent this, iris 52 can be driven by a stepper motor or a continuous motor set to permit several aperture sizes (or even a continuous variation), so that iris 52 can be moved from one aperture size to the next until the system is close enough to focus to accept the full incident light beam. Alternatively, a software hysteresis system can be used to limit successive oscillations. These techniques may require multiple steps, but would be preferred to attempting to do the same thing with just the classic half-blocked system.

Figure 7:
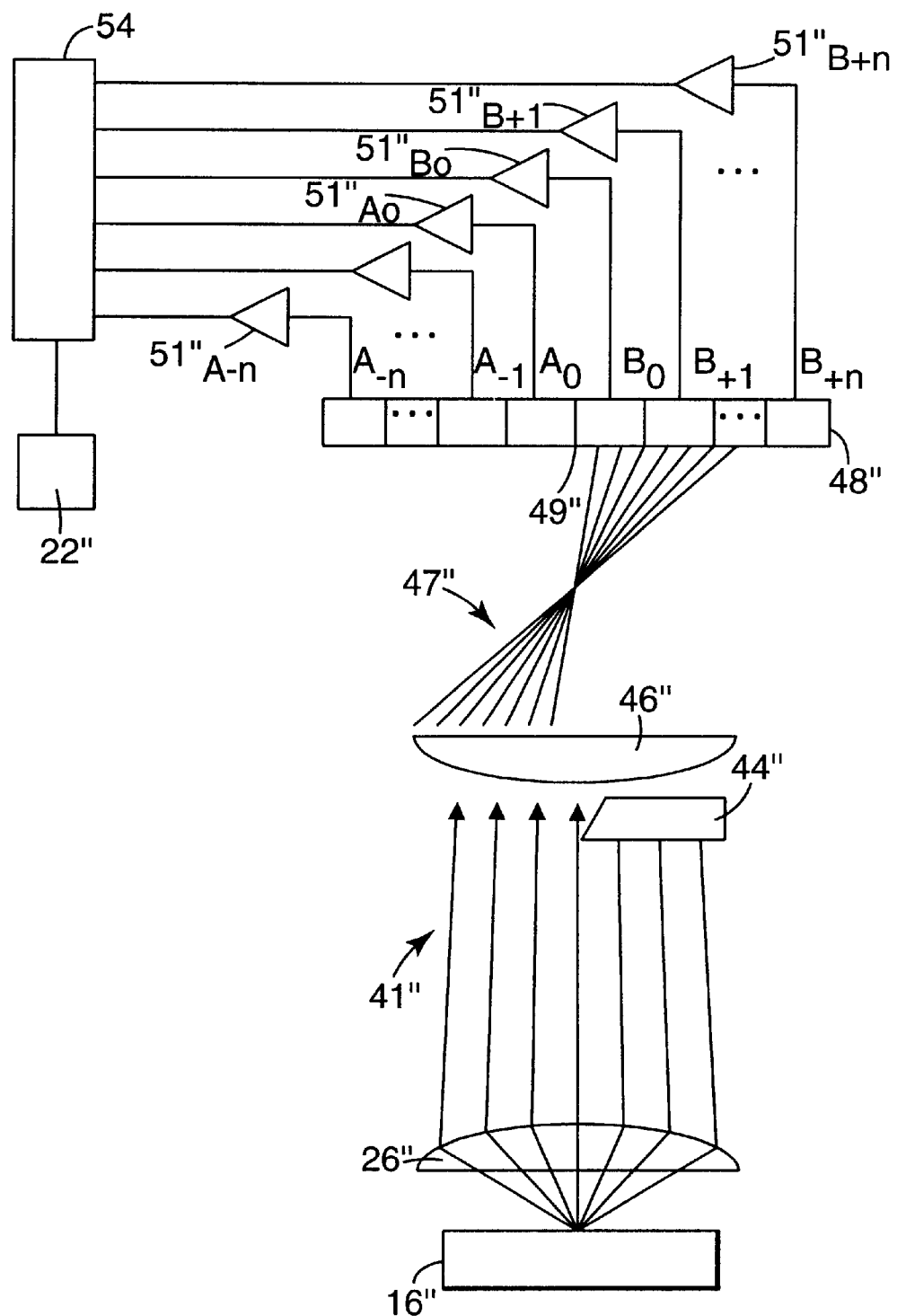
FIG. 7 is a schematic illustration of the half-blocked focusing system of FIGS. 3a, b, c modified according to a second embodiment according to the present invention.

A second embodiment according to the invention is shown in FIG. 7. In FIG. 7, the elements analogous to those shown in FIGS. 3a, b, c have been shown with the same numbers with a double-prime (").

While the halves A, B of photodetector 48 extended from the focal center 49 to the outer edge of the photodetector, the analogous elements in photodetector 48" shown in FIG. 7 are split into a series of elements $A_{-n}, \ldots A_{-1}, A_0, B_0, B_{+1}, \ldots, B_{+n}$. Each element acts independently and is connected to its own FES circuit $51_{A-n}, \ldots 51_{A-1}, 51_{A0}, 51_{B0}, 51_{B+1}, \ldots, 51_{B+n}$, which in turn is connected through an analog-to-digital converter 54 to the computer 22", which controls the z-stage position.

With the multiple elements in photodetector 48", the offset from the center of the beam of light 47" incident on the photodetector 48" can be detected to a reasonable degree of accuracy based on the distribution of light detected by elements $A_{-n}, \ldots A_{-1}, A_0, B_0, B_{+1}, \ldots, B_{+n}$. This in turn gives an estimate of the amount by which sample 16" is out of focus.

As will be apparent, the first and second embodiments could be combined, providing an even broader range for the depth of field in which the system can quickly come to focus.

It will be understood that these exemplary embodiments in no way limit the scope of the invention. Steps in the focusing process do not necessarily need to be performed strictly in the order described here; any order that accomplishes the same goals would work. Other modifications of the invention will be apparent to those skilled in the art in view of the foregoing description. These descriptions are intended to merely to provide specific examples of embodiments which clearly disclose the present invention. Accordingly, the invention is not limited to the described embodiments or to the use of specific elements, dimensions, materials or configurations contained therein. All alternative modifications and variations of the present invention which fall within the spirit and scope of the appended claims are covered.

We claim:

1. A focusing system for an optical system for imaging light from a sample, the system comprising:
   a) a photodetector for receiving and detecting a light beam from the sample along an optical path, the photodetector having at least four parts positioned at at least two different radial distances from a center of the photodetector, each part independently detecting the intensity of the light falling upon it and generating a light intensity signal indicative thereof;
   b) at least one lens in the optical path between the sample and the photodetector for focusing the light beam coming from the sample;
   c) a knife edge positioned in the optical path between the sample and the photodetector for blocking at least one, but not all, of the parts of the photodetector from receiving the light beam from the sample;
   d) a stage for holding the sample;
   e) a focus mechanism for controllably moving at least one lens or the stage along the optical path in response to a focus signal to adjust the focus of the system; and
   f) a controller for generating the focus signal in response to the light intensity signals, by:
      i) subtracting light intensity signals from substantially opposite parts of the photodetector to generate a focal error signal indicative of a direction in which the image of the sample is out of focus;
      ii) comparing light intensity signals from parts of the photodetector at different radial positions to determine an amount by which the image of the sample is out of focus;
      iii) generating a focus signal in response to which the focus mechanism will adjust the focus of the system in the direction and by an amount sufficient to bring the focal error signal closer to zero; and
      iv) repeating steps (i) through (iii) until the focal error signal is within a predetermined acceptable range.

2. A method of focusing an optical system for imaging light from a sample, the system having:
   i) a photodetector for receiving and detecting a light beam from the sample along an optical path, the photodetector having at least four parts positioned at at least two different radial distances from a center of the photodetector, each of which independently detects the intensity of the light falling upon it;
   ii) at least one lens in the optical path between the sample and the photodetector for focusing the light beam coming from the sample;
   iii) a knife edge positioned in the optical path between the sample and the photodetector for blocking at least one, but not all, of the parts of the photodetector from receiving light from the sample;
   v) a stage for holding the sample; and
   vi) a focus mechanism for controllably moving the at least one lens or the stage along the optical path in response to adjust the focus of the system;
   the method comprising:
   a) comparing the intensity of the light on substantially opposite parts of the photodetector to determine the direction in which the image of the sample is out of focus;
   b) comparing the intensity of the light from parts of the photodetector at different radial positions to determine an amount by which the image of the sample is out of focus;
   c) moving the focus mechanism in the direction and by an amount sufficient to bring the sample closer into focus; and
   d) repeating steps (a) through (c) until the sample is in focus.

* * * * *

UNITED STATES PATENT AND TRADEMARK OFFICE
CERTIFICATE OF CORRECTION

PATENT NO. : 6,717,124 B2 Page 1 of 1
APPLICATION NO. : 10/411733
DATED : April 6, 2004
INVENTOR(S) : Matthew R. C. Atkinson It is certified that error appears in the above-identified patent and that said Letters Patent is hereby corrected as shown below:

Column 1
Line 16, delete "NIMA-202-979-1051" and insert in place thereof
-- NMA 202-97-9-1050 --.
Lines 17-18, delete the words "of the Department of Commerce".

Signed and Sealed this

Twenty-fourth Day of June, 2008

JON W. DUDAS
*Director of the United States Patent and Trademark Office*